(12) United States Patent
Costanzo et al.

(10) Patent No.: US 8,816,616 B2
(45) Date of Patent: Aug. 26, 2014

(54) METHOD OF CONTROLLING A THREE-PHASE PERMANENT MAGNET SYNCHRONOUS MOTOR FOR REDUCING ACOUSTIC NOISE

(75) Inventors: Dino Costanzo, Catania (IT); Stello Matteo Billé, Valverde (IT)

(73) Assignee: STMicroelectronics S.R.L., Agrate Brianza (MB) (IT)

( * ) Notice: Subject to any disclaimer, the term of this patent is extended or adjusted under 35 U.S.C. 154(b) by 459 days.

(21) Appl. No.: 13/152,822

(22) Filed: Jun. 3, 2011

(65) Prior Publication Data
US 2011/0298405 A1    Dec. 8, 2011

(30) Foreign Application Priority Data

Jun. 4, 2010  (IT) ................. VA2010A0046

(51) Int. Cl.
*H02P 21/00* (2006.01)
(52) U.S. Cl.
USPC ................ 318/400.02; 318/400.34
(58) Field of Classification Search
USPC ........... 318/400.02, 400.34, 400.37, 400.39, 318/798, 800, 801
See application file for complete search history.

(56) References Cited

U.S. PATENT DOCUMENTS

| | | | |
|---|---|---|---|
| 6,232,731 B1 * | 5/2001 | Chapman ................. | 318/801 |
| 6,630,809 B2 * | 10/2003 | Chen et al. ............... | 318/804 |
| 6,674,262 B2 * | 1/2004 | Kitajima et al. .......... | 318/722 |
| 7,034,493 B2 * | 4/2006 | Yoshimoto et al. ....... | 318/629 |
| 7,075,264 B2 * | 7/2006 | Huggett et al. ........ | 318/400.02 |
| 7,339,344 B2 * | 3/2008 | Borisavljevic et al. ..... | 318/723 |

FOREIGN PATENT DOCUMENTS

| | | | |
|---|---|---|---|
| EP | 1870680 | 12/2007 | ............ G01D 21/02 |
| EP | 2012425 | 1/2009 | ............ H02P 21/00 |
| EP | 2043255 | 4/2009 | ............ H02P 21/00 |
| EP | 2048061 | 4/2009 | ............ B62D 6/00 |
| JP | 11089275 | 3/1999 | ............ H02P 6/18 |
| JP | 11089297 | 3/1999 | ............ H02P 21/00 |
| JP | 20044032944 | 1/2004 | ............ H02P 21/00 |
| JP | 2004064909 | 2/2004 | ............ H02P 21/00 |
| JP | 2006007860 | 1/2006 | ............ B62D 6/00 |

OTHER PUBLICATIONS

Stoelting et al., "Handbook of fractional-horsepower drives", Springer, 2006, pp. 92-107.

* cited by examiner

*Primary Examiner* — Rina Duda
(74) *Attorney, Agent, or Firm* — Allen, Dyer, Doppelt, Milbrath & Gilchrist, P.A.

(57) ABSTRACT

A method of controlling a synchronous motor that may include windings and a power driving stage coupled to the windings, may include using a feedback loop including using a feedback circuit coupled to the windings to generate current feedback components, using current controllers for generating respective voltage signals, and using an anti-transform circuit for generating control signals for the power driving stage. Using the feedback loop may include generating additional compensation signals for compensating the control signals, and adding the additional compensation signals from the current controllers by one of generating the additional compensation signals as quadrature and direct voltage compensation signals and adding them to the voltage signals to generate compensated quadrature and direct signals, and supplying the compensated quadrature and direct signals to the power driving stage by providing the compensated quadrature and direct signals to the anti-transform circuit.

20 Claims, 4 Drawing Sheets

METHOD OF CONTROLLING A THREE-PHASE PERMANENT MAGNET SYNCHRONOUS MOTOR FOR REDUCING ACOUSTIC NOISE

FIELD OF THE INVENTION

This invention relates to current vector control of multiphase electrical motors, and, more particularly, to a method and a related device for driving a three-phase permanent magnet synchronous motor (PMSM) while reducing acoustic noise.

BACKGROUND OF THE INVENTION

One of the most widely used techniques for controlling PMSMs is vector control, or its field oriented control (FOC) embodiment. This technique, which also uses the space vector modulation (SVM) technique, may be able to produce a stator magnetic flux, synchronous with the rotor flux, whose amplitude and related displacement (orientation) increase the electromagnetic torque produced versus current consumption. Improved accuracy measurement of the rotor position, and speed and phase currents of the motor may be desired.

FIG. 1 is a block diagram of a system for controlling the torque in a three-phase motor using the FOC technique. The feedback signals, $I_{sd}$ (direct current) and $I_{sq}$ (quadrature current), that the controllers ISO and ISQ (that typically are PI controllers) compare with the reference currents $I_{sd}^{ref}$ and $I_{sq}^{ref}$, are obtained with a double transform of the phase currents of the motor $I_a$, $I_b$ and $I_c$. These currents, measured by sensors, are first transformed from the three-phase stator reference system to a two-phase stator reference system (Clarke transform), $$I_\alpha = I_a$$
$$I_\beta = \frac{I_a}{\sqrt{3}} + \frac{2I_b}{\sqrt{3}} \qquad (1)$$
$$0 = I_a + I_b + I_c$$

To transform the currents $I_\alpha$, $I_\beta$ in a rotor reference system (that is a time invariant system of coordinates), a further transform may be desired (Park transform) in which the angular (electrical) position $\theta_{el}$ of the rotor is used:

$$I_{sd} = I_\alpha \cos(\theta) + I_\beta \sin(\theta)$$
$$I_{sq} = -I_\alpha \sin(\theta) + I_\beta \cos(\theta) \qquad (2)$$

The controllers ISD and ISQ, that are the controllers of the currents $I_{sd}$ and $I_{sq}$, generate reference voltages $V_{sd}$ and $V_{sq}$ as a function of the difference between the reference currents and the feedback currents. These voltages, after having been transformed with the inverse of the Park transform, $$V_\alpha = V_{sd} \cos(\theta) - V_{sd} \sin(\theta)$$
$$V_\beta = V_{sd} \sin(\theta) + V_{sd} \cos(\theta) \qquad (3)$$

are supplied to the PWM generator of the inverter. Therefore, in steady state conditions, i.e., constant torque, constant rotor speed, the motor is supplied with sinusoidal voltages and currents.

When a speed control loop is put in place, the reference currents $I_{sd}^*$ and $I_{sq}^*$ are adjusted such to make the motor speed $\omega_{rotor}$ track a desired value $\omega_{rotor}^*$, otherwise the reference current are selected to produce a desired electromagnetic torque $T_e^*$. Rotor electrical angular position and speed are typically measured by sensors, for example, encoders, Hall sensors, and resolvers, or may be estimated or observed by exploiting the mathematic model of the motor and known parameters.

Depending on design and/or manufacturing processes, permanent magnets synchronous motors (PMSM) may generate a non-sinusoidal back electromotive force (BEMF), i.e. the BEMF produced has, of course, relatively the same rotation frequency of the rotor, but also has a non negligible content of harmonics of a higher order.

For this reason, because of the shape of the BEMF, a torque ripple superimposes on the electromagnetic torque produced with state-of-the-art field oriented control circuits. This torque ripple may often cause an audible noise. Therefore it may be desirable to drive a three-phase electric motor with reduced generation of acoustic noise.

Chapter 2.2.4 of H. D. Stoelting, E. Kallenbach, W. Amrhein, *Handbook of Fractional-Horsepower Drives*, Springer, describes a technique for deleting noise by superimposing a current $i_{ck}$ on the operational sinusoidal current curve $i_k$ upstream with respect to the current regulation block to suppress the torque ripple. A block diagram illustrating this technique is illustrated in FIG. 2 of the present application, which corresponds to FIG. 2.85 of H. D. Stoelting, E. Kallenbach, W. Amrhein, *Handbook of Fractional-Horsepower Drives*, Springer. Unfortunately, in many practical cases noise cannot be sufficiently reduced and remains increasingly annoying.

SUMMARY OF THE INVENTION

A method of driving a three-phase motor and a related feedback controller that addresses the problem of increased acoustic noise generation is described. Differently from known driving methods, wherein the quadrature and direct components of the control voltage are uniquely determined by the controllers ISQ and ISD as a function of the difference between the estimated quadrature and direct components of the current that generally correspond to the desired motor speed or electromagnetic torque to be produced and the quadrature and direct components of the effective current, respectively, according to the method of the present embodiments, the quadrature and direct components of the control voltage are corrected with additional components at the frequencies to be compensated. These additional components may be added downstream the controllers ISQ and ISD, and may be transformed either on the same rotating reference frame synchronous with the rotor where those controllers operate, or directly on the three-phase stator reference frame.

Differently from the cited prior technique above, H. D. Stoelting, E. Kallenbach, W. Amrhein, *Handbook of Fractional-Horsepower Drives*, Springer, the effectiveness of the method of the present embodiments, is generally not conditioned by the requisite of a relatively large current bandwidth of the control loop. The requirement of a relatively large current bandwidth is hardly satisfied when stator currents feedback signals come from low cost devices, such as shunt resistors placed on the DC bus link or below the low-side switch of the driving inverter legs.

According to an embodiment of the motor drive circuit, audible noise due to torque ripple is greatly reduced, and may be practically deleted, by injecting additional components adapted to compensate the effects on the produced torque which are due to $5^{th}$ and $7^{th}$ harmonics of BEMF. According to another embodiment, this may be accomplished by injecting additional components at the sixth harmonic of the stator electrical frequency, the fundamental or main frequency hereafter, such that the fifth and seventh harmonics of the torque ripple are compensated.

DETAILED DESCRIPTION OF THE PREFERRED EMBODIMENTS

Acoustic noise generated by driving an electric motor with sinusoidal driving voltages is effectively reduced by injecting harmonics at a frequency multiple of the stator electrical frequency (called main harmonic hereafter) to compensate the fifth and seventh harmonic of the BEMF.

Figure 3:
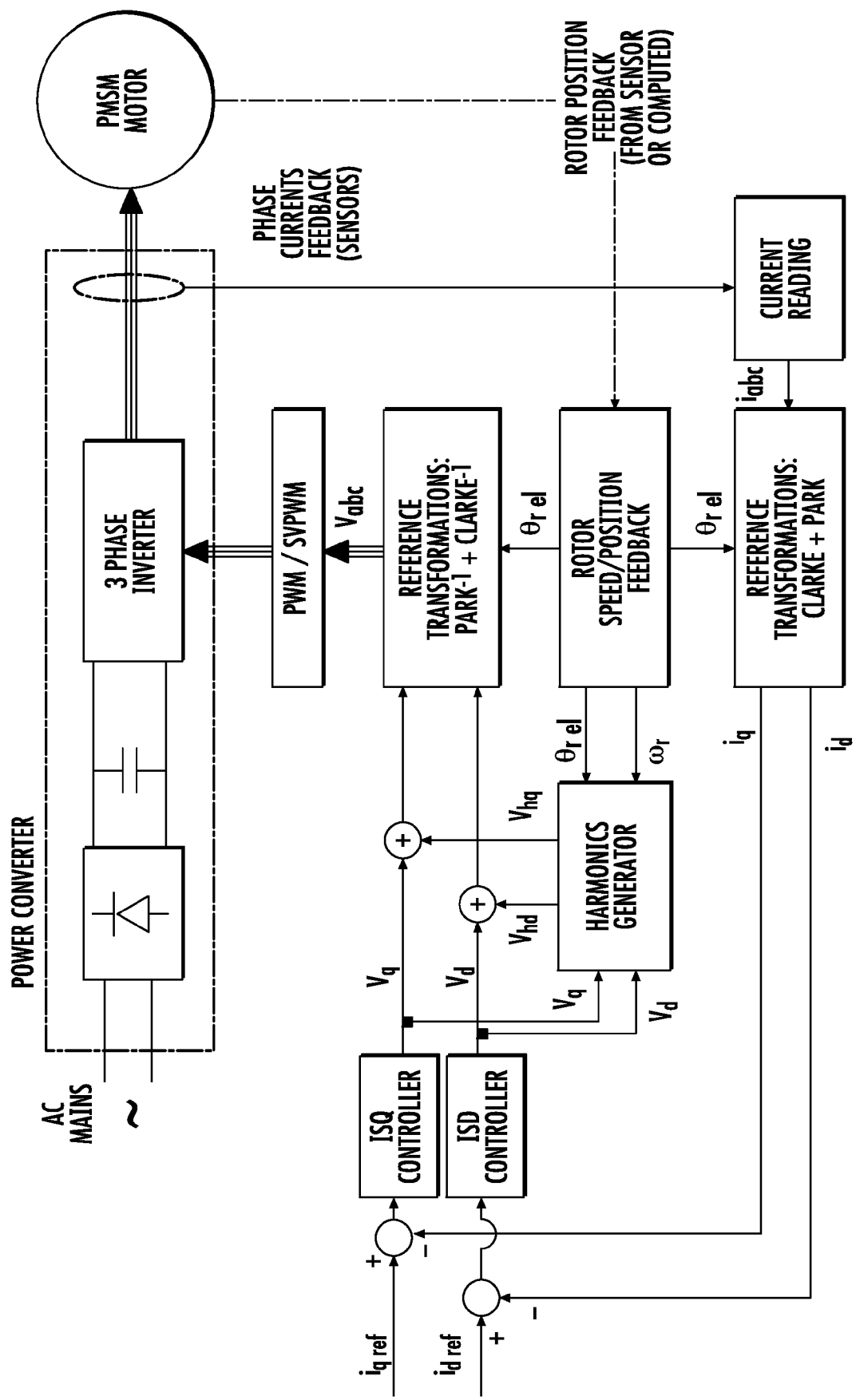
FIG. 3 is a schematic block diagram of an embodiment of a FOC control scheme including a compensation harmonics generator connected downstream the ISD and ISQ controllers, operating on the Park reference frame, according to the present invention.
Figure 4:
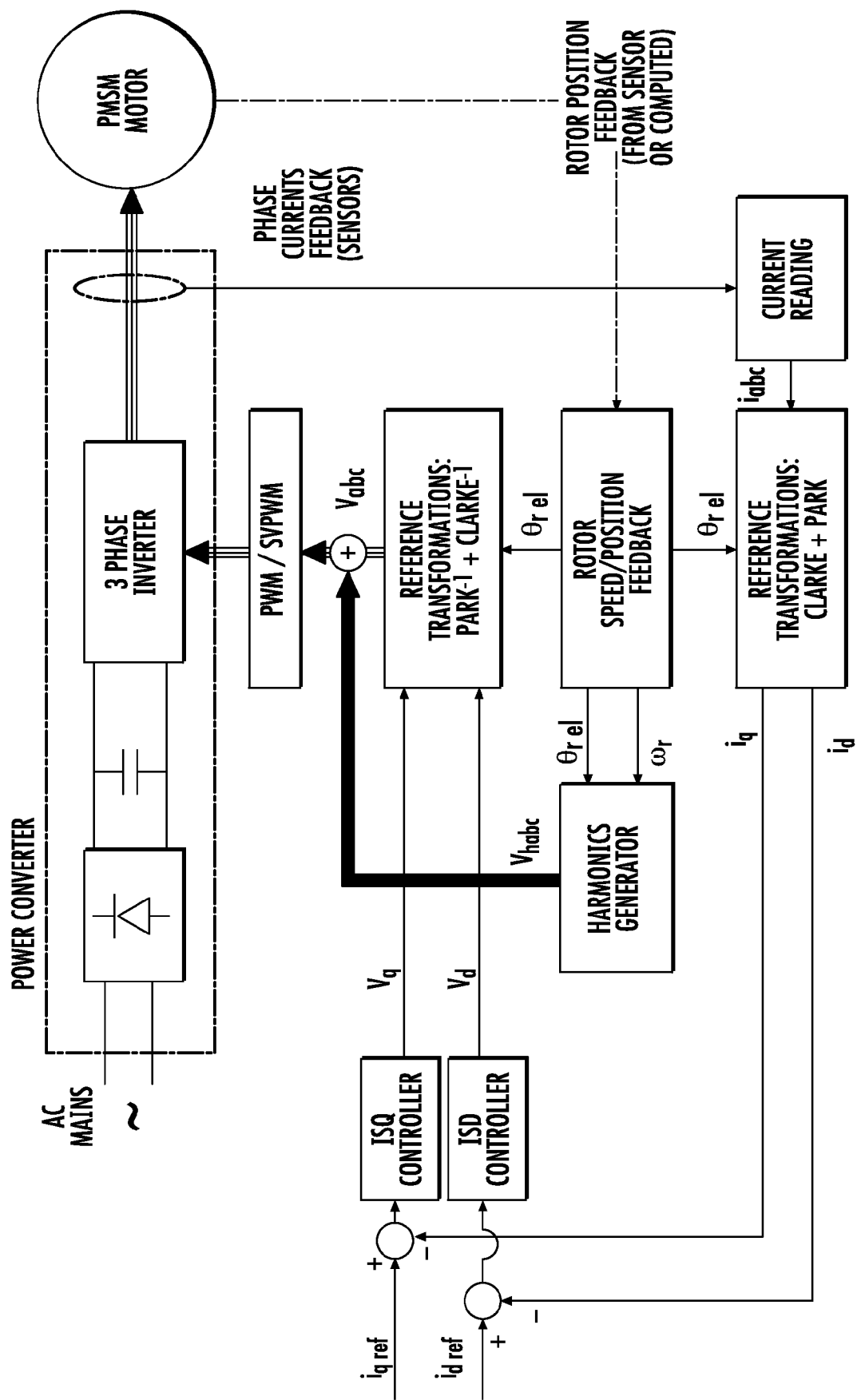
FIG. 4 is a schematic block diagram of another embodiment of a FOC control scheme including a compensation harmonics generator connected downstream the ISD and ISO controllers, operating on the three-phase stator reference frame, according to the present invention.

According to an embodiment of the control method, schematically illustrated in FIG. 3, the additional components at higher harmonics are injected downstream the ISD and ISQ controllers by a dedicated generator harmonics generator (e.g., a first compensation circuit as illustrated in FIGS. 3 and 4) and are added to the quadrature and direct components of the control voltages $V_{sq}$ and $V_{sd}$, respectively. This compensates higher order harmonics of the BEMF induced in the windings by the motion of the rotor. According to another embodiment, the additional components (e.g., via a second compensation circuit, which may include adders as illustrated in FIGS. 3 and 4) at the sixth harmonic compensate the effects on the produced torque which are due to the fifth and seventh harmonics of the BEMF.

The block harmonics generator produces a sixth harmonic of the main harmonic (since it is operating on Park's reference frame) whose destination, amplitude, and phase shift, with respect to rotor electrical angle, are determined according to one of the following methods:

1) Injection on axes Vq: Vhd=0, Vhq≠0; for each measured rotor speed $\omega_r$ (or, for example, for some speed conditions where acoustic noise quietness is increasingly desirable for the application), a thorough combined scanning of Vhq's phase and magnitude (inside their variation ranges, 360° electrical degrees and 0V to a selected threshold, respectively) is performed while the amplitude oscillation of Vd, at a frequency six times higher than the main harmonic, for example, is monitored. The effective Vhq phasor is determined to be the one that reduces or minimizes the above-mentioned Vd oscillation, and hence applied. The effective Vhq phasor may be stored in the non-volatile memory of the controller, for example.

2) Injection on axes Vd: Vhq=0, Vhd≠0; for each measured rotor speed $\omega_r$ (or, for example, for some speed conditions where acoustic noise quietness is increasingly desirable for the application), a thorough combined scanning of Vhd's phase and magnitude (inside their variation ranges, 360° electrical degrees and 0V to a selected threshold, respectively) is performed while the amplitude oscillation of Vq, at frequency six times higher than the main harmonic, is monitored. The effective Vhd phasor is determined to be the one that greatly reduces or minimizes the above-mentioned Vq oscillation, and hence applied. The effective Vhd phasor may be stored in the non-volatile memory of the controller, for example.

3) The method of 1) with a band-stop filter centered on the sixth harmonic upstream of the ISQ controller.

4) The method of 2) with a band-stop filter centered on the sixth harmonic upstream of the ISD controller.

5) The method of 1), but by monitoring the amplitude oscillation of a signal coming from a microelectromechanical system (MEMS), related to mechanical vibration at a frequency six-times higher than the main harmonic, instead of monitoring the amplitude oscillations of Vd.

6) The method of 2), but by monitoring the amplitude oscillation of a signal coming from a MEMS, related to mechanical vibration at a frequency six-times higher than the main harmonic, instead of monitoring the amplitude oscillations of Vq.

7) The method of 1), but skipping the scanning phase once the Vhq phasor, which is a function of rotor speed, has been stored, and applying the Vhq phasor for each given speed.

8) The method of 2), but skipping the scanning phase once the Vhd phasor, which is a function of rotor speed, has been stored, and applying the Vhd phasor for each given speed.

Figure 1:
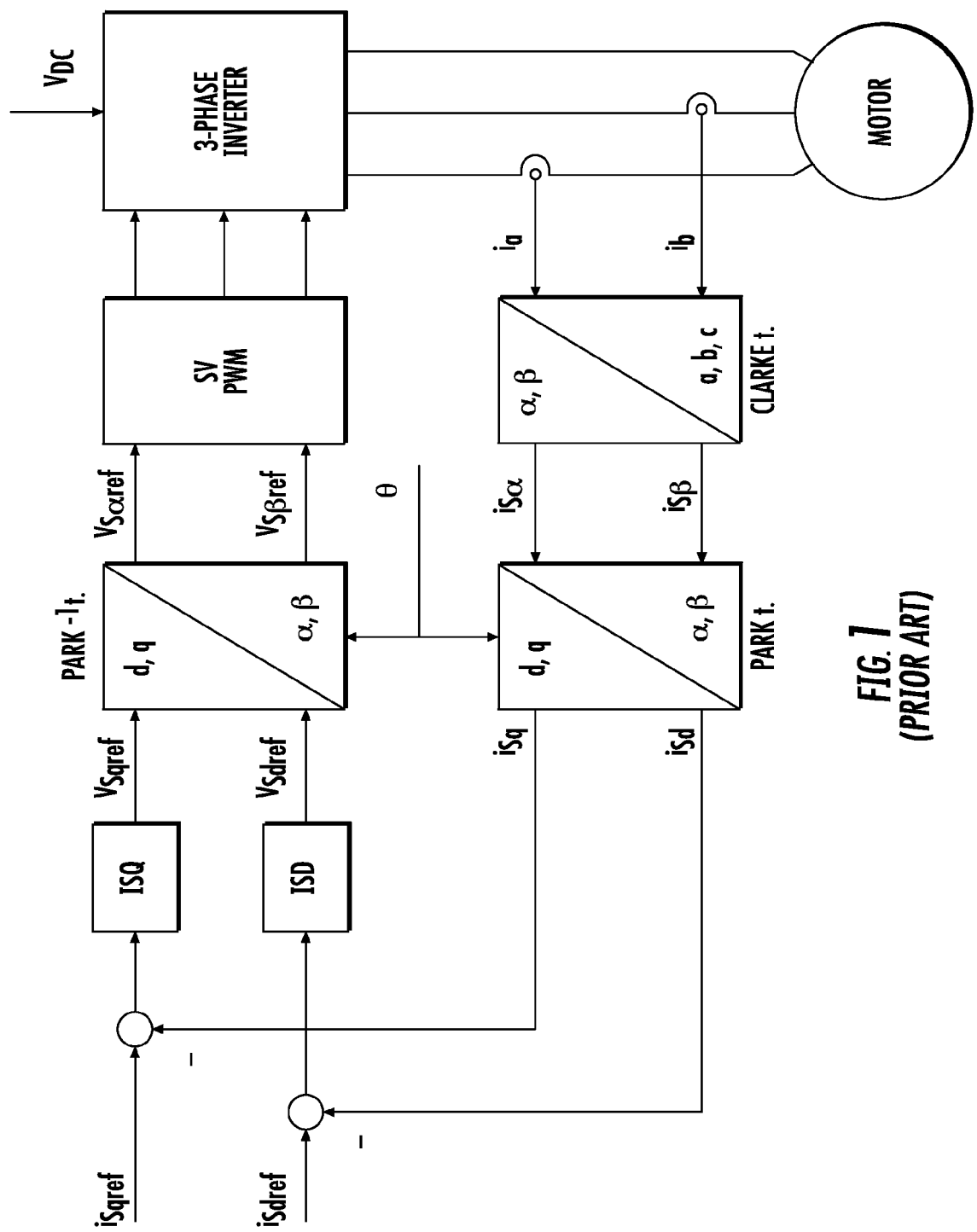
FIG. 1 is a schematic block diagram of a FOC control scheme of an electric motor according to the prior art.
Figure 2:
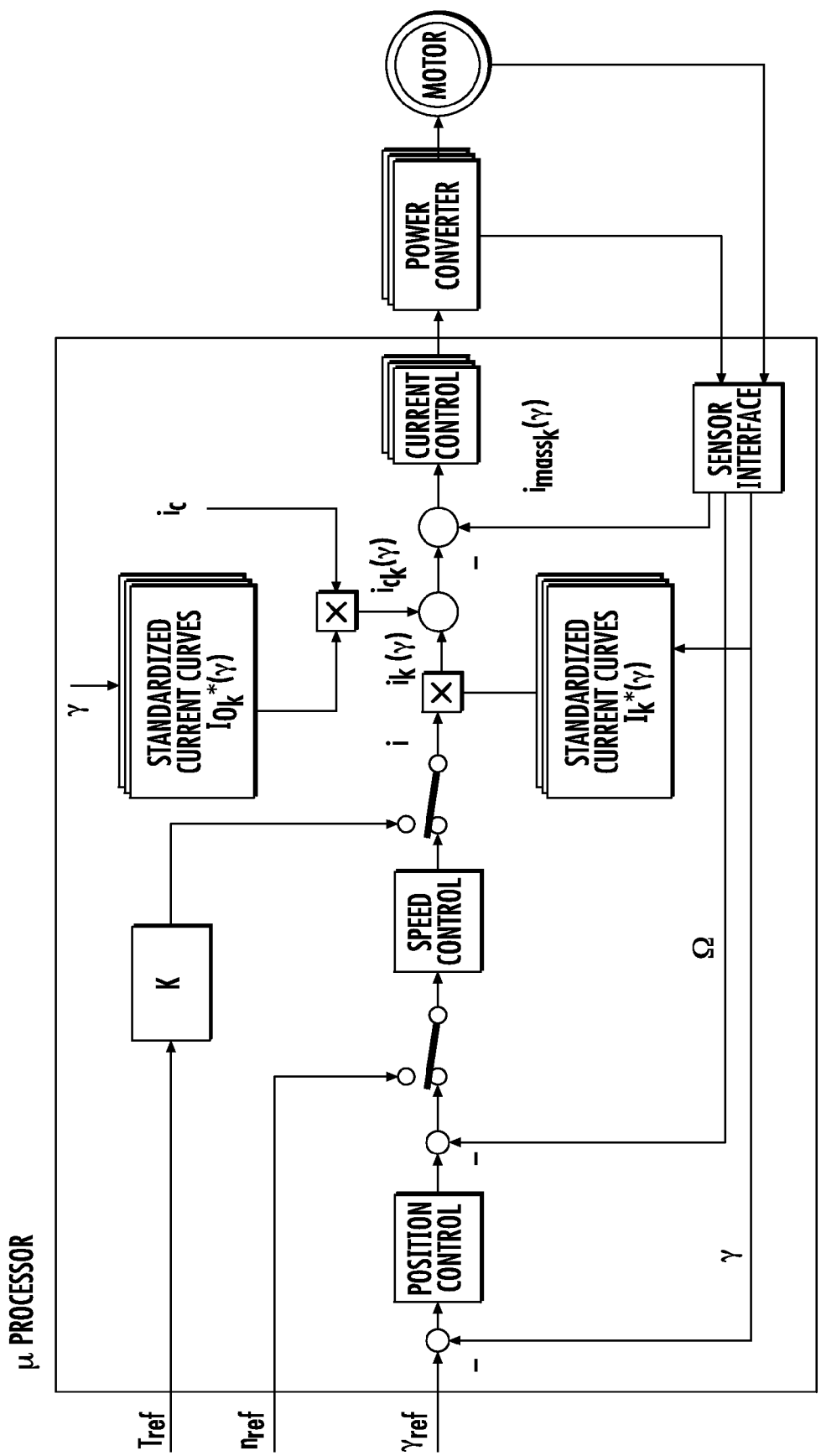
FIG. 2 is a schematic block diagram of a control technique for reducing acoustic noise generated by torque ripple according to the prior art.

As yet another alternative embodiment, the additional components at higher harmonics may be injected in the control loop downstream from the controllers ISD and ISQ after the inverse Clarke and Park transforms. This alternative embodiment is illustrated in FIG. 4. It will be appreciated that elements not specifically described with respect to FIGS. 3 and 4, for example, the PMSM motor, the PWM/SVPWM block, the current position sensors, and the power converter, are previously described with respect to FIGS. 1 and 2.

That which is claimed:

1. A method of feedback controlling a three-phase permanent magnet synchronous motor according to a vector control technique using a feedback loop including a feedback circuit coupled to windings of the motor for generating feedback quadrature and direct current components according to Clarke and Park transforms of currents sensed through the windings of the motor, quadrature and direct current controllers respectively input with differences of the quadrature and of the direct current components with corresponding quadrature and direct current reference values, respectively, for generating respective quadrature and direct voltage signals, and a Clarke and Park anti-transform circuit block coupled to the quadrature and direct current controllers for generating control signals of a power driving stage of the motor, the method comprising:

sensing the rotor position and the rotor speed;

generating additional compensation signals for compensating the control signals supplied to the power driving stage to reduce motor torque ripple, the additional compensation signals being generated at a frequency corresponding to a given harmonic of the rotor speed with an amplitude and phase and based upon the quadrature and direct voltage signals to compensate an upper and lower harmonic relative to the given harmonic of a back-electromotive force induced in the windings by rotation of the rotor;

adding the additional compensation signals downstream from the quadrature and direct current controllers by one of generating the additional compensation signals as quadrature and direct voltage compensation signals and adding them to the quadrature and direct control voltage signals to generate compensated quadrature and direct signals, and supplying the compensated quadrature and direct signals to the power driving stage of the motor by at least providing the compensated quadrature and direct signals to the Clarke and Park anti-transform circuit block, and adding the additional compensation signals directly to the control signals supplied to the power driving stage of the motor.

2. The method of claim 1, wherein the given harmonic comprises a sixth harmonic of the rotor speed, and the upper and lower harmonics comprise the seventh and fifth harmonics, respectively, of the back-electromotive force induced in the windings by the rotation of the rotor.

3. The method of claim 1, wherein a transducer electric signal is generated from a mechanical vibration transducer coupled to a housing of the motor; and wherein the additional compensation signals are configured to reduce the transducer electric signal.

4. A method of controlling a synchronous motor comprising windings and a power driving stage coupled to the windings, the method comprising:

using a feedback circuit coupled to the windings to generate first and second current feedback components based upon currents sensed through the windings;

using first and second current controllers respectively input with differences of the first and second current feedback components with corresponding first and second reference current values, respectively, to generate respective first and second voltage signals;

using an anti-transform circuit coupled to the first and second current controllers for generating control signals for the power driving stage;

generating additional compensation signals for compensating the control signals, the additional compensation signals being generated at a frequency corresponding to a given harmonic associated with the synchronous motor and based upon the first and second voltage signals to compensate an upper and lower harmonic relative to the given harmonic of a back-electromotive force induced in the windings; and adding the additional compensation signals to the control signals.

5. The method of claim 4, wherein the first and second current feedback components comprise quadrature and direct current feedback components, respectively.

6. The method of claim 4, wherein the quadrature and direct current feedback components are generated according to at least one of a Clarke transform and a Park transform.

7. The method of claim 4, wherein the first and second reference current values comprise quadrature and direct current reference values, respectively.

8. The method of claim 4, wherein the first and second controllers comprise quadrature and direct current controllers, respectively.

9. The method of claim 4, wherein the first and second voltage signals comprise first and second quadrature and direct voltage signals, respectively.

10. The method of claim 4, wherein the anti-transform circuit comprises at least one of a Clarke and a Park anti-transform circuit.

11. A feedback control device for a three-phase permanent magnet synchronous motor comprising a power driving stage, windings coupled to the power driving stage, and a rotor coupled to the windings, the feedback control device comprising:

a feedback circuit coupled to the windings and configured to generate feedback quadrature and direct current components according to the Clarke and Park transforms of currents sensed through the windings;

quadrature and direct current controllers, respectively input with differences of the quadrature and of the direct current components with corresponding quadrature and direct current reference values, respectively, and configured to generate respective quadrature and direct voltage signals;

a Clarke and Park anti-transform circuit coupled to said quadrature and direct current controllers, and configured to generate control signals for the power driving stage;

at least one sensor configured to sense the rotor position and the rotor speed;

a first compensation circuit configured to generate additional compensation signals for compensating the control signals supplied to the power driving stage to reduce motor torque ripple, said first compensation circuit being configured to generate the additional compensation signals at a frequency corresponding to a given harmonic of the rotor speed with an amplitude and phase and based upon the quadrature and direct voltage signals to compensate an upper and lower harmonic relative to the given harmonic of a back-electromotive force induced in the windings by rotation of the rotor; and a second compensation circuit downstream from said quadrature and direct current controllers, and configured to add the additional compensation signals.

12. A feedback control device for a synchronous motor comprising a power driving stage, windings coupled to the power driving stage, the feedback control device comprising:

a feedback circuit coupled to the windings and configured to generate first and second current feedback components based upon currents sensed through the windings;

first and second controllers, respectively input with differences of the first and second current feedback components with corresponding first and second current reference values, respectively, and configured to generate respective first and second voltage signals;

an anti-transform circuit coupled to said first and second current controllers, and configured to generate control signals for the power driving stage;

a first compensation circuit configured to generate additional compensation signals for compensating the control signals, said first compensation circuit being configured to generate the additional compensation signals at a frequency corresponding to a given harmonic associated with the synchronous motor and based upon the first and second voltage signals to compensate an upper and lower harmonic relative to the given harmonic of a back-electromotive force induced in the windings; and a second compensation circuit coupled to said first and second controllers, and configured to add the additional compensation signals.

13. The feedback control device of claim 12, wherein said anti-transformation circuit comprises a Park anti-transform circuit.

14. The feedback control device of claim 12, wherein said anti-transformation circuit comprises a Clarke anti-transform circuit.

15. The feedback control device of claim 12, wherein said feedback circuit is configured to generate feedback quadrature and direct current components.

16. The feedback control device of claim 12, wherein said feedback circuit is configured to generate the first and second current feedback components based upon at least one of a Clarke transform and a Park transform.

17. The feedback control device of claim 12, wherein said first and second controllers comprise quadrature and direct current controllers, respectively.

18. The feedback control device of claim 12, wherein said first and second current reference values comprise quadrature and direct current reference values.

19. The feedback control device of claim 12, wherein the first and second voltage signals comprise quadrature and direct voltage signals.

20. The feedback control device of claim 12, wherein the motor comprises a rotor coupled to the windings; further comprising at least one sensor coupled to said rotor and configured to sense at least one of a position and a speed of said rotor; and wherein the additional compensation signals are based upon the at least one of a position and a speed of said rotor.

* * * * *